(No Model.)
N. HARRIS.
SCREW PLATE.
No. 369,002. Patented Aug. 30, 1887.
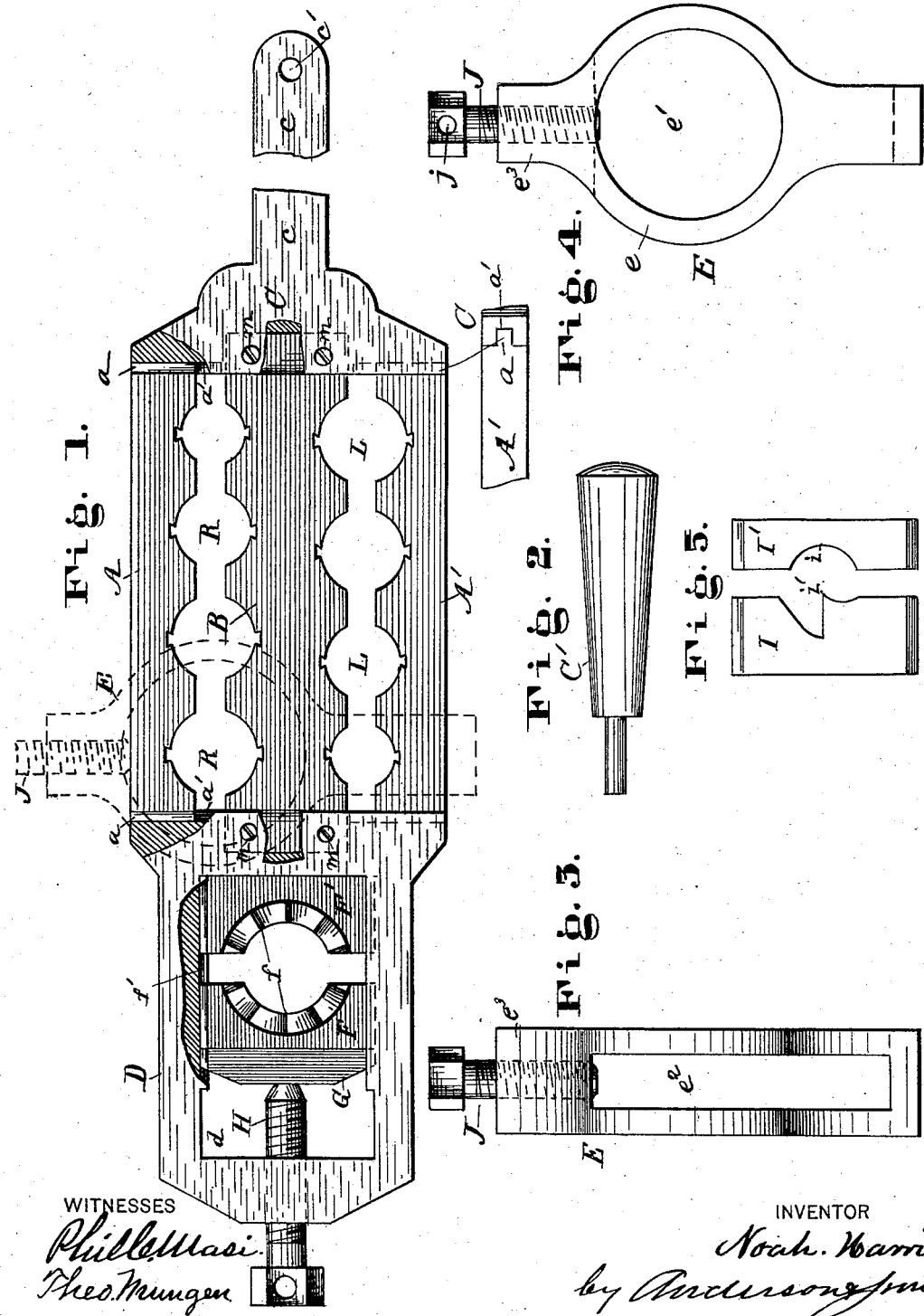
WITNESSES
INVENTOR

UNITED STATES PATENT OFFICE.

NOAH HARRIS, OF VINCENNES, INDIANA.

SCREW-PLATE.

SPECIFICATION forming part of Letters Patent No. 369,002, dated August 30, 1887.

Application filed November 30, 1886. Serial No. 220,302. (No model.)

*To all whom it may concern:*

Be it known that I, NOAH HARRIS, a citizen of the United States, and a resident of Vincennes, in the county of Knox and State of Indiana, have invented certain new and useful Improvements in Screw-Plates; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a side elevation of a device embodying my improvements. Figs. 2, 3, 4, and 5 are detail views of parts of the same.

The invention relates to improvements in screw-plates, by means of which the shoulders of the axle-journals of vehicles—such as buggies and carriages—can be cut inward and the threads on the end of said journals can also be extended inward, so that the wheels, when the hubs are worn, can be tightened up in place.

The invention is so constructed that it can be used upon the axle by supporting the same and removing the journal-nut; and it consists in the construction and novel arrangement of parts hereinafter described and claimed.

Referring to the accompanying drawings by letter, C and D form the end portions of the frame of the device. The part C is provided with the longitudinal handle c, standing from the central part of its outer edge and provided near its outer end with the opening c', for the reception of the reduced end of the detachable handle C', by which, when attached, the device is rotated. The part D is of general rectangular form, and is provided with a central rectangular opening, d, as shown in the drawings.

The parts C and D have, respectively, in the inner edges of their end rails or bars recesses into which fit, and are secured by the screws m m, the ends of the die-bar B, which extends axially between the parts C and D.

A A' are die-bars on each side, respectively, of the bar B, and having their ends a rabbeted or tenoned, so as to slide inward and outward in the grooves a' in the inner edges of the parts C and D. The inner edge of the bar A has formed upon it the halves of the die or screw-cutting openings R, the remaining halves of which are formed on the adjacent edge of the bar B. The inner edge of the bar A' has formed upon it the halves of the similar openings, L, the remaining halves of said openings being formed on the adjacent edge of the bar B, which is thus notched or recessed on both edges.

The openings R decrease regularly in size from the part D to the part C, and the openings L decrease similarly in size from the part C to the part D.

The openings R have their thread-cutting edges inclined reversely to those of the openings L, so that one series of openings may be suitable to cut the threads on each end of an axle.

E is a brace-frame having a circular central portion, e, provided with a concentric central opening, e', and $e^2$ is a longitudinal slot made at right angles to said opening and long enough to straddle transversely the bars A, A', and B.

J is a screw or bolt passing through a threaded opening in the end $e^3$ of the frame E, with its inner end, when the parts are engaged, impinging on the outer edge either of the bar A or the bar A', but upon the former, as shown in the drawings. The outer end of said screw or bolt is provided with a transverse opening, j, for the reception of the end of a lever-bar, by means of which the bolt or screw J may be turned more easily.

The brace-frame E being set over the die-bars in position for the opening e' to stand over any of the openings R or L, the set-screw J is turned down on the edge of the bar A or A', so as to hold the same down on the journal that is in one of said openings and is about to have threads cut upon it. It is evident that the brace-frame may be moved or reversed to have the opening e' stand over any one of said openings.

F and F' are similar blocks provided with opposite semicircular notches on their adjacent edges, and the cutting teeth or edges f made on one side of the said notches. The said blocks have their end edges rabbeted or tenoned, so as to travel in the grooves f' in the inner edges of the arms forming the sides of the opening d.

G is a block, also having its ends rabbeted or tenoned to travel in said grooves and lying against the outer edge of the block F.

H is a set-screw passing through a threaded opening in the outer transverse bar of the part D and impinging upon the outer edge of the block G. The outer end of the screw H is provided with a transverse opening, by means of which and a proper lever-bar the blocks F F' may be set a proper distance apart to cut inward the shoulder of an axle-journal of any size.

To cut off the end of a journal the tools I I' are substituted for the blocks F F', the said tools having their edges beveled similarly to the said blocks. The tool I' is provided with the semicircular notch $i$, in which the bar to be cut lies, and the tool I is provided with the cutting-point $i'$. Tools of any other proper shape may be used, however.

It is evident from the above description that the shoulders of the axle-journals can be cut inward a proper distance by the blocks F F', that the journals can then be inwardly threaded by the die-openings R and L, and that the protruding end of the journals can be cut off by the tools I I'.

I am aware that two plates having screw-dies in their opposing edges have been embraced in a clamp-frame, the latter having been provided with a screw, one end of which is seated in one of the plates, and having a hand-wheel at its projecting end, by which said screw may be turned to adjust the plates to any desired distance apart, as shown in Patent No. 343,058, of June 1, 1886, and I do not claim said construction herein.

Having described my invention, what I claim, and desire to secure by Letters Patent, is—

1. In a device to cut screw-threads, the combination of the end parts or pieces, C D, constructed substantially as described, the fixed central die-bar having die-notches on each edge, and the adjustable die-bars on each side of the same, provided with die-notches on their inner edges, registering with similar die-notches in the adjacent edges of the fixed die-bar, substantially as specified.

2. In a device to cut screw-threads, the combination of the end parts or pieces, C and D, the fixed central longitudinal die-bar, B, connecting said end pieces, the adjustable die-bars A A', having their ends rabbeted or tenoned to move in grooves on the inner edges of said end pieces, the brace or clamp frame E, having the opening $e'$ and slot $e^2$, and the set-screw J, to hold said brace-frame on the die-bars A A', substantially as specified.

3. The combination, with the end pieces, C D, and die-bars A, A', and B, all constructed substantially as described, of the cutting-blocks F F', provided with rabbeted or tenoned ends to move in corresponding grooves in the longitudinal bars of the opening $d$ of the piece D, the block or bar G, and the set-screw H, passing through a threaded opening in the end bar of the opening $d$ and impinging upon the block or bar G, substantially as specified.

4. The combination, with the end pieces, C D, and die-bars A A' B, all constructed substantially as described, of the cutting-tools I I', having their ends rabbeted or tenoned to move in corresponding grooves in the piece D, the block or bar G, and the set-screw H, substantially as specified.

In testimony whereof I affix my signature in presence of two witnesses.

NOAH HARRIS.

Witnesses:
E. M. FULLER,
R. F. WEEMS.